United States Patent

Smith et al.

[11] Patent Number: 4,636,012
[45] Date of Patent: Jan. 13, 1987

[54] TRACK ROLLER MOUNTING BRACKET

[75] Inventors: Joseph J. Smith, Dubuque, Iowa; Dean J. Stillmunkes, East Dubuque, Ill.

[73] Assignee: Deere & Company, Moline, Ill.

[21] Appl. No.: 554,518

[22] Filed: Nov. 23, 1983

[51] Int. Cl.⁴ .............................................. B62D 55/14
[52] U.S. Cl. ...................................... 305/28; 384/255
[58] Field of Search ...................... 305/24, 25, 27, 28; 198/840, 842, 841; 72/237; 384/255, 256; 180/9.1

[56] References Cited

U.S. PATENT DOCUMENTS

| | | | |
|---|---|---|---|
| 2,834,639 | 5/1958 | Herr, Jr. ............................ | 305/28 X |
| 2,989,351 | 6/1961 | Deysher et al. ..................... | 305/28 |
| 2,991,132 | 7/1961 | Schwartz et al. ................... | 305/28 X |
| 3,869,931 | 3/1975 | Boggs ................................ | 305/28 X |
| 4,257,653 | 3/1981 | Meisel, Jr. et al. ................. | 305/28 |
| 4,422,696 | 12/1983 | Seit .................................. | 305/28 |

Primary Examiner—David A. Scherbel

[57] ABSTRACT

Track rollers are mounted to the track frame by brackets having mounting holes which are asymmetric relative to the roller shaft. This permits the rollers to be mounted in alternative positions along the frame, by turning them end-for-end, for the purpose of altering the pattern of wear caused on the track links when the links impact the rollers and for reducing impact vibrations by altering the roller spacing.

3 Claims, 1 Drawing Figure

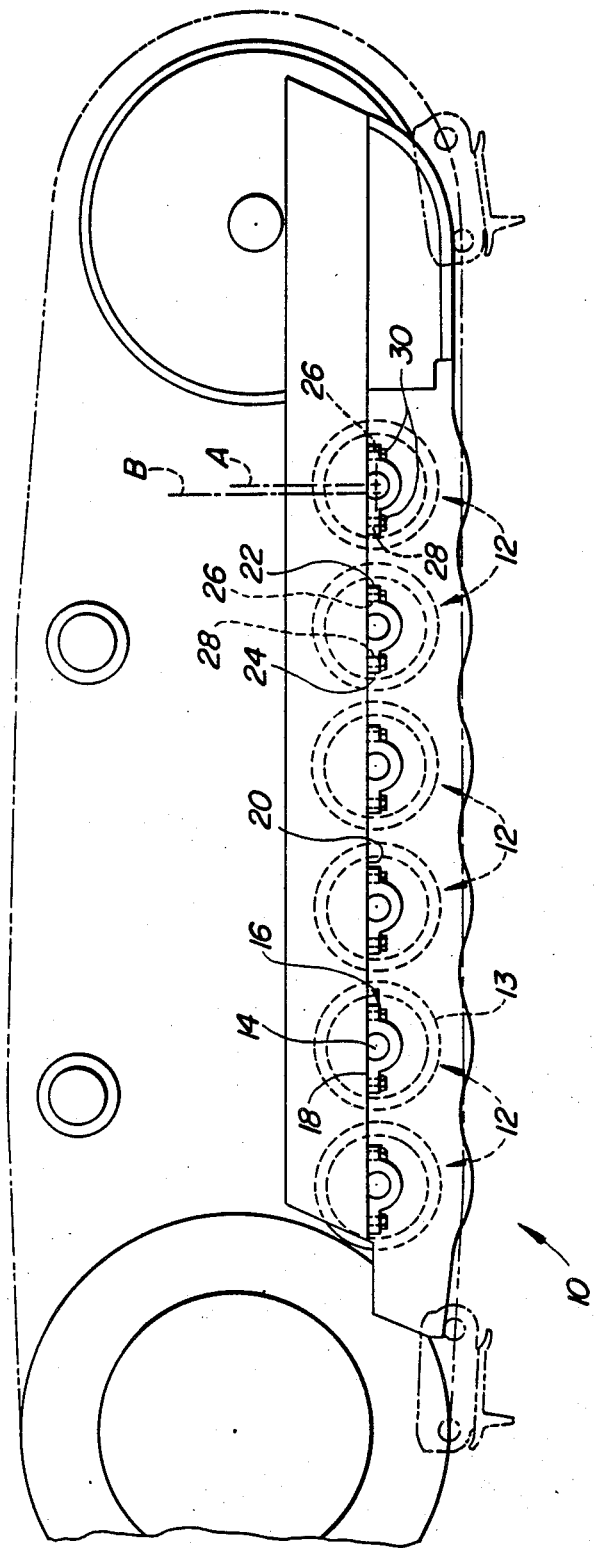

TRACK ROLLER MOUNTING BRACKET

BACKGROUND OF THE INVENTION

The present invention relates to track assemblies for track-laying vehicles and more particularly relates to bracketry for securing track support rollers to a track frame.

As a track chain operates, it impacts the track support rollers resulting in the generation of noise and vibration. It is common practice to mount the support rollers at evenly spaced locations along the track frame, and as the chain links impact thereagainst, a scalloped wear pattern occurs on the link rails. As the wear becomes more pronounced, the vibrations resulting from chain operation become more severe and accelerate the wear.

Up to now, designers have proposed ways of lessening the vibrations induced by the chain impacting the rollers by using resilient components in the mounting of the rollers. An example of such a mounting is disclosed in U.S. Pat. No. 2,775,492 issued on Dec. 25, 1956. Also, attempts have been made to minimize uneven track link wear by hard facing critical areas of the link rails. An example of such a link design is illustrated in U.S. Pat. No. 3,955,855 issued May 11, 1976.

These prior art attempts have certain advantages; however, they have the disadvantage of being somewhat costly.

SUMMARY OF THE INVENTION

According to the present invention there is provided a novel track roller mounting bracket.

An object of the invention is to alter the wear pattern on link rails resulting from their impact with track rollers by altering the position of one or more track rollers.

A more specific object is to provide a track roller mounting bracket at each end of a roller shaft and to provide each bracket with mounting holes located symmetrically relative to the shaft so that by merely turning the roller and brackets end-for-end the shaft and hence the roller is placed at two different locations along the track frame to which the brackets are fastened.

Another object is to reduce the vibrations resulting from the chain impacting on the rollers by varying the roller spacing.

These and other objects, features and advantages of the present invention will become apparent to those skilled in the art from the description which follows and from the drawing.

BRIEF DESCRIPTION OF THE DRAWING

The sole FIGURE is a somewhat schematic, side elevational view of a track frame having track rollers attached thereto by brackets constructed in accordance with the principles of the present invention.

DESCRIPTION OF THE PREFERRED EMBODIMENT

Referring now to the drawing, there is shown a track frame 10 having a plurality of track roller assemblies 12 mounted thereon at equally spaced locations therealong. Specifically, each of the roller assemblies comprises a roller 13 received on a shaft 14 having opposite ends non-rotatably mounted in brackets 16 (only one shown). Each of the brackets 16 has a flat surface 18 engaged with a bottom surface 20 of the frame 10. As viewed in the drawing, the bracket 16 includes right- and left-hand flanges 22 and 24, respectively, having vertical holes 26 and 28 located therein, with the hole 26 being closer to a point A coincident with the longitudinal axis of the shaft 14 than is the hole 28. Bolts 30 are received in the holes 26 and 28 and threaded into threaded holes (not visible) located in the frame 10 in alignment with the holes 26 and 28.

If an operator observes that a scalloped wear pattern is beginning to develop on the rails of a track chain which runs over the rollers, the pattern may be altered by removing the bolts 30 holding the brackets to the frame and turning the roller assemblies 12 end-for-end and reinserting the bolts 30. Because the holes 26 and 28 are at different distances from the center of the shaft 14, the turning of the assembly 12 will result in the center of the shaft 14 being located at point B.

We claim:

1. In a track roller assembly including first and second brackets fixed to opposite ends of a shaft upon which a track roller is rotatably mounted and said brackets each having first and second mounting flanges located at opposite sides of a center point of the shaft, the improvement, comprising: said first and second mounting flanges respectively containing first and second mounting holes spaced unequally from said center point, whereby the track roller assembly is adapted to be mounted to a track frame in alternate end-for-end reversed positions for disposing the track roller in alternate positions along the track frame.

2. In a track assembly including a track frame, a plurality of sets of mounting holes spaced along said frame, a plurality of roller assemblies each including bracket means provided with a set of mounting holes matched with one of the plurality of sets of mounting holes provided in the track frame, and each bracket means holding a shaft upon which a roller is rotatably mounted, the improvement comprising: said mounting holes provided in each bracket means being asymmetrically located relative to the longitudinal axis of the shaft held by the bracket means, whereby the roller assembly may be turned end-for-end so as to dispose the roller at two different locations along the track frame.

3. The track assembly defined in claim 2 wherein said bracket means comprises first and second brackets having the opposite ends of an associated one of the shafts received therein and each of said first and second brackets including first and second mounting flanges located at opposite sides of the longitudinal axis of the shaft; and said set of mounting holes in the bracket means comprises a mounting hole in each of the first and second mounting flanges with the holes in the first flanges of each of the first and second brackets being spaced equally from said axis, with the holes in the second flanges of each of the first and second brackets being spaced equally from said axis and with the holes in the first and second flanges being asymmetrical relative to said axis.

* * * * *